United States Patent [19]
Gerstner et al.

[11] Patent Number: 6,164,807
[45] Date of Patent: Dec. 26, 2000

[54] FASTENING ARRANGEMENT OF A COVER DISK AS A COMPONENT OF A MOTOR VEHICLE HEADLIGHT

[75] Inventors: Harald Gerstner; Reiner Jocher, both of Aidlingen, Germany

[73] Assignee: DaimlerChrysler AG, Stuttgart, Germany

[21] Appl. No.: 09/258,886

[22] Filed: Mar. 1, 1999

[30] Foreign Application Priority Data

Feb. 28, 1998 [DE] Germany .............. 198 08 564

[51] Int. Cl.⁷ ............................................. F21V 7/04
[52] U.S. Cl. ..................... 362/549; 362/546; 362/267
[58] Field of Search ................... 362/509, 520, 362/546, 549, 267, 310

[56] References Cited

U.S. PATENT DOCUMENTS 4,860,173  8/1989  Jocher et al. ................... 362/546
5,562,338  10/1996  Yamamoto ..................... 362/549 X
5,735,596  4/1998  Daumueller .................. 362/546 X

FOREIGN PATENT DOCUMENTS 3728752  12/1988  Germany .
4414899  7/1995  Germany .
9-63308  3/1997  Japan .
2273150  6/1994  United Kingdom .

Primary Examiner—Stephen Husar
Attorney, Agent, or Firm—Evenson, McKeown, Edwards & Lenahan, P.L.L.C.

[57] ABSTRACT

In a known headlight for a motor vehicle, a lens is glued to a headlight shell. According to the invention, a cover disk is surrounded, on its outer circumference, with at least one outwardly projecting profile shoulder. A sealing profile is designed as a securing frame which form-lockingly reaches over the profile shoulder of the cover disk and is mechanically fastened to the shell. The fastening arrangement is used for front headlights of passenger cars.

20 Claims, 2 Drawing Sheets

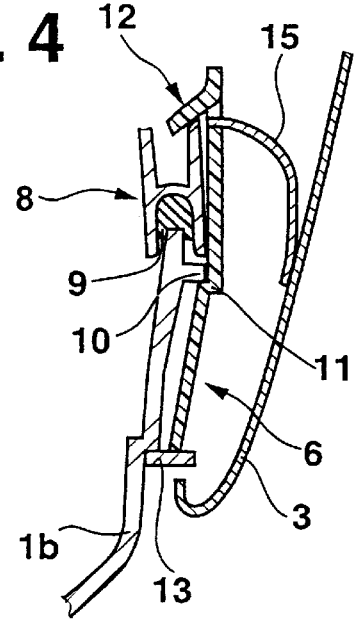
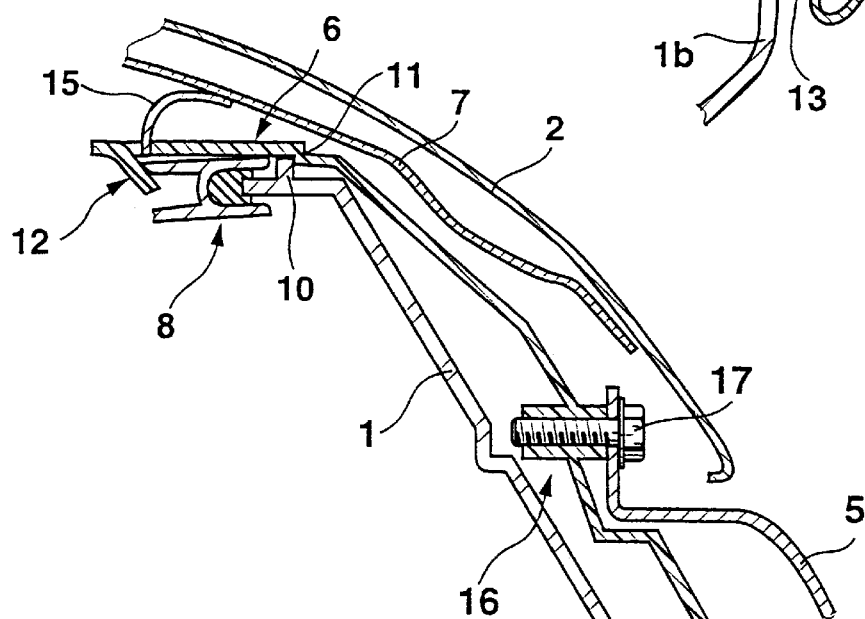
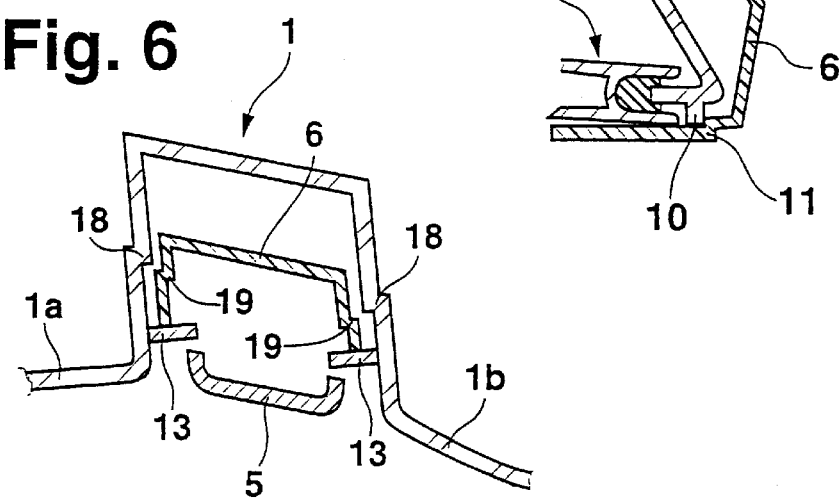

FASTENING ARRANGEMENT OF A COVER DISK AS A COMPONENT OF A MOTOR VEHICLE HEADLIGHT

This application claims the priority of German patent application No. 198 08 564.8, filed Feb. 28, 1998.

BACKGROUND AND SUMMARY OF THE INVENTION

The present invention relates to a fastening arrangement for a cover disk as a component of a motor vehicle headlight, the motor vehicle headlight comprising a shell as well as the cover disk, which is transparent, which closes at least one open side of the shell, and which is glued to the shell, as well as to a sealing profile framing the cover disk.

Such a fastening arrangement for a cover disk of a motor vehicle headlight is known from German Patent Document DE 44 14 899 C1. The headlight has a headlight shell which, in the area of its open side, is provided with a surrounding frame into which a lens is inserted which is used as a cover disk. The lens is glued to the frame. The frame itself is an undetachable part of the shell. The lens is enclosed by a flexible sealing profile which closes gaps between the lens and the adjoining vehicle body parts. At high outside temperatures, the glued connection between the lens and the shell may soften so that there can no longer be a positionally secure connection between the lens and the shell.

It is also known from German Patent Document DE 37 28 752 C1 to secure a lens glued to the shell of a headlight by an additional fastening frame which is welded to the shell and is fixed to the lens by a glued connection. However, in this case, positional problems may also occur when the bonding agents soften because of higher ambient temperatures.

It is an object of this invention to provide a fastening arrangement of the initially mentioned type which, independently of the temperature, permits a constant positioning of the cover disk on the shell.

This object is achieved by constructing the cover disk, on its outer circumference, with at least one outwardly projecting profile shoulder, and by designing the sealing profile as a securing frame which reaches in a form-locking manner over the profile shoulder of the cover disk which is fastened to the shell by mechanical devices. The form-locking reaching-over of the profile shoulder of the cover disk and the mechanical fixing of the securing frame on the shell achieve a secure positioning of the cover disk on the shell without any positional changes of the cover disk because of a softening of the glued connection between the shell and the cover disk; this results from form-lockingly and mechanically fixing the cover disk by the securing frame. Several webs may be provided as the profile shoulder in the area of the cover disk, and the cover disk is preferably made of plastic. A surrounding profile web may also be provided which is used as a profile shoulder. In a simple manner, the profile shoulder may also be designed as a step in the outer contour of the cover disk. The securing frame has a correspondingly designed profiling in order to be able to form-lockingly reach over the at least one profile shoulder. Mechanical fastening of the securing frame on the shell can take place by detent connections, screwed connections, combined detent/screwed connections, or any other suitable mechanical connection.

As a further development of the invention, a profile section of the securing frame facing away from the shell is designed as a gap screen adapted to the gaps between the cover disk and the adjoining vehicle body parts. This gap screen may be freely designed with respect to its color and, in particular, may be adapted to the paint color of the adjoining body parts or designed to be transparent. As a result, an aesthetically attractive arrangement of the headlight is achieved for a corresponding vehicle body.

In a further development of the invention, the securing frame has at least one fastening receiving device for linking an operating component, particularly a bumper section. This provides the securing frame with an additional function. A particularly low-tolerance linking of a bumper section or of another non-supporting vehicle body part can be achieved by drilling a threaded bore with a step drill when the bumper section is in the mounted condition.

In yet a further development of the invention, the securing frame has at least one outwardly projecting elastic sealing lip which, for tight contact, is arranged on adjoining vehicle body parts. This sealing lip must not be a surrounding sealing lip; rather, it can only be provided in sections at relevant spaces between the headlight and the respective adjoining vehicle body part. The at least one sealing lip results in a sealing-off of the surrounding field of the headlight, which permits improved aerodynamics and noise reduction in the installed condition of the headlight. If the headlight is positioned in front of an engine compartment of the motor vehicle, then this at least one sealing lip also reduces dirtying of the engine compartment.

BRIEF DESCRIPTION OF THE DRAWINGS

Additional advantages and characteristics of the invention are also claimed. A preferred embodiment of the invention is illustrated in the drawings and described in the following.

FIG. 4 is another sectional view along section line IV—IV in FIG. 1;

FIG. 5 is another sectional view of the headlight arrangement according to FIG. 1 along section line V—V in FIG. 1; and FIG. 6 is a sectional view of the headlight arrangement according to FIG. 1 along section line VI—VI in FIG. 1.

DESCRIPTION OF THE PREFERRED EMBODIMENT

Figure 1:
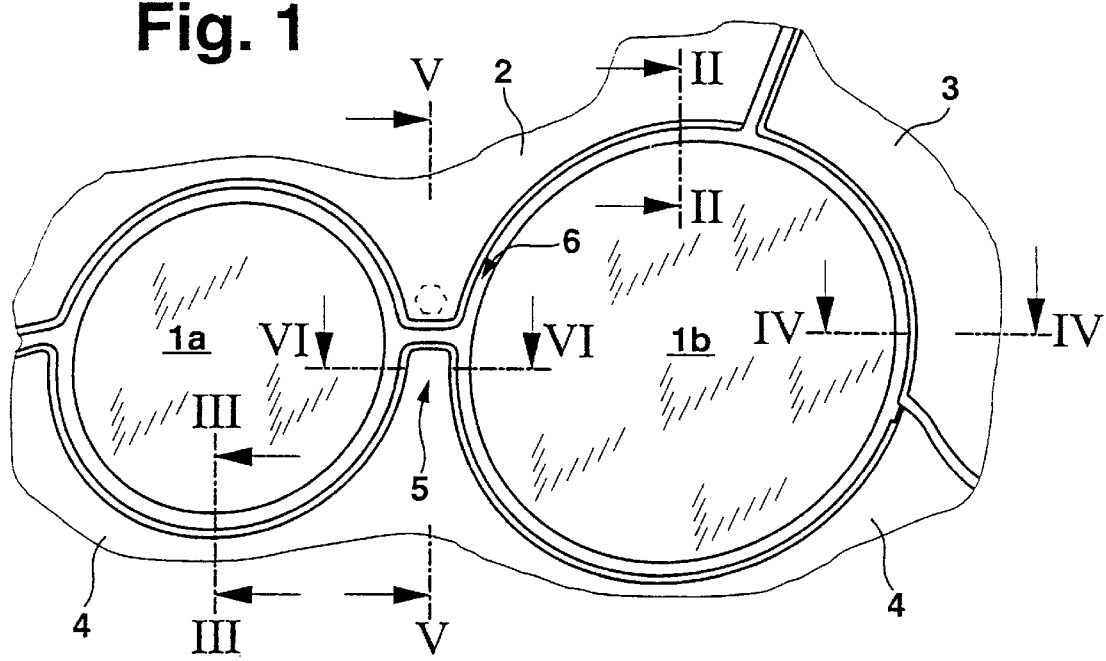
FIG. 1 is a frontal view of an embodiment of a headlight according to the invention in a frontal area of a passenger car.
Figure 2:
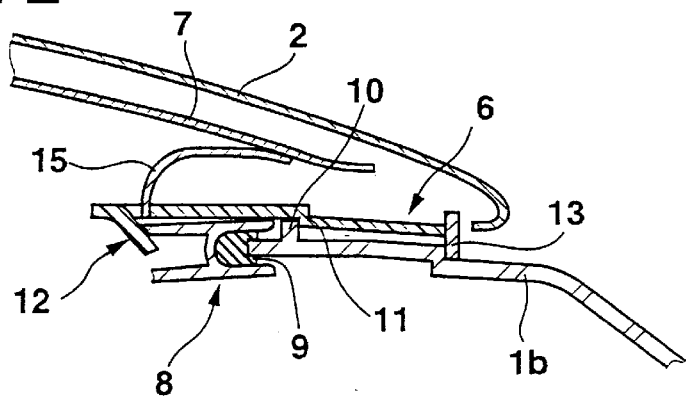
FIG. 2 is a sectional view of the headlight arrangement according FIG. 1 along section line II—II in FIG. 1.
Figure 3:
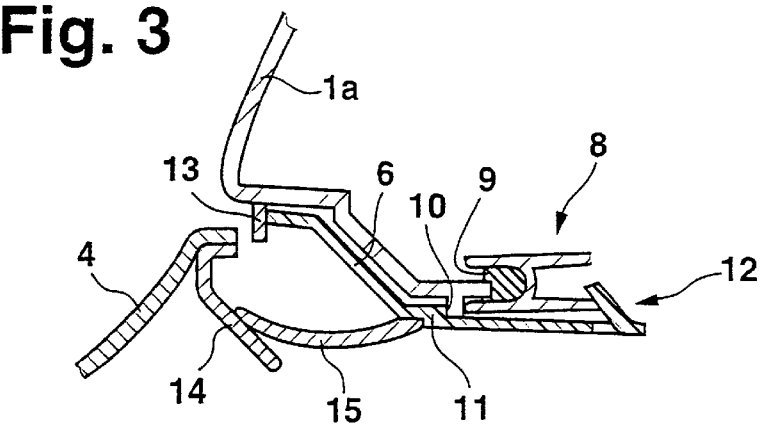
FIG. 3 is another sectional view along section line III—III in FIG. 1.

In its installed condition in a passenger car, a headlight according to FIGS. 1 to 6 is arranged in a frontal area of the vehicle body. The headlight has two reflectors in a common shell 8, the shell 8 being covered toward the front by a cover disk in the form of a lens 1. At the level of each reflector, the lens 1 is divided into an ellipse-type or a circle-type lens section 1a, 1b respectively. In the installed condition of the headlight, the lens sections 1a and 1b are bordered by adjoining vehicle body parts. An engine hood 2 represents the upwardly adjoining vehicle body part. A fender 3 adjoins laterally to the outside as a vehicle body part. In the downward direction, the lens sections 1a and 1b are framed by a bumper 4 serving as a vehicle body part. The lens 1, 1a, 1b is fixed by a surrounding gluing 9 in a fastening profile of the shell 8. The fastening profile may be a one-piece portion of the shell or may be fixedly connected with the shell as a separate component. In both cases, the fastening profile accommodating the gluing 9 is a fixed part of the shell 8. In a manner which is not shown because it is known, the shell 8 of the headlight is fixed on a vehicle body supporting structure of the passenger car. The lens 1, 1a, 1b is produced in one piece from a plastic material.

A surrounding securing frame 6 is provided for additionally securing the lens 1, 1a, 1b on the shell 8, and particularly on the fastening profile of the shell 8. The surrounding securing frame is made of a plastic material, preferably of a thermoplastic elastomer. In addition to the glued connection 9, the securing frame 6 holds the lens 1, 1a, 1b form-lockingly on the fastening profile of the shell 8. For this purpose, the outer edge of the lens 1, 1a, 1b is provided in a surrounding manner with a profile shoulder 10 in the form of an outwardly projecting web. As an alternative and instead of a surrounding web, several webs or steps may be provided, arranged in a distributed manner along the circumference of the lens, and used as profile shoulders. The profile shoulder 10 reaches form-lockingly over a corresponding step 11 of the securing frame 6. Relative to the normal driving direction of the vehicle, at the rearward-side end of the securing frame 6, the securing frame 6 has several elastically locking detent noses 12 which are distributed along the circumference of the securing frame and which reach behind corresponding undercuts of the fastening profile of the shell 8 which are also used as detent elements. The elastic detent noses 12 can be molded in one piece to the securing frame 6 or can be connected with the securing frame 6 as separate bracket-type projections. Naturally, the detent connections for mechanically fastening the securing frame 6 on the shell 8 can also be designed in a different manner and be to positioned at other points of the shell or of its fastening profile, as long as the holding function of the securing frame 6 on the shell 8 is ensured.

A frontal section of the securing frame 6 is provided with a gap screen 13 which is designed as a transverse web and is supported on a corresponding outer edge of the lens 1, 1a, 1b. The gap screen 13 may be a one-piece part of the securing frame 6 and, with respect to its color, can be adapted to the paint of the adjoining vehicle body parts or to the transparent design of the lens 1, 1a, 1b. However, the gap screen can also be fixedly connected with the securing frame 6 by gluing or welding. The gap screen 13 closes gaps between the outer edge of the lens 1, 1a, 1b and the adjoining edges of the engine hood 2, the fender 3, the bumper 4, and a bumper tooth 5.

In addition, viewed along the circumference of the lens 1, 1a, 1b, the securing frame 6 is provided with an elastically flexible sealing lip 15 which is placed against corresponding interior sides of the adjoining vehicle body parts and thus reduces contamination of the engine compartment as well as the generation of noise and the drag coefficient of the vehicle. The sealing lip 15 may be a one-piece part of the securing frame 6.

In the area of the engine hood 2, the sealing lip 15 rests against an interior shell 7 of the engine hood 2. In the area of the bumper 4, the sealing lip 15 rests against an interior web 14 of the bumper 4. At the level of the fender 3, the sealing lip 15 rests directly against the interior wall of the fender 3.

As can be recognized particularly from FIG. 5, the securing frame 6 is additionally used for fastening adjoining vehicle body part sections, in the present case, for fastening a bumper section in the form of the bumper tooth 5 of the bumper 4. For this purpose, a fastening receiving device 16 is provided on the securing frame 6 which is molded on in one piece and into which a threaded bore can be placed for receiving a fastening screw 17. Preferably, the position of the threaded bore is designed as a function of the passage hole for the fastening screw 17 in the bumper tooth 5. For this purpose, the threaded bore will not be drilled before the bumper 4 is mounted in the frontal area. In particular, it is advantageous for the passage bore in the bumper tooth 5 to also not be made before the bumper is mounted, together with the threaded bore in the fastening receiving device 16, by a step drill. Steps 18 defined in the lens 1 are aligned with steps 19 defined in the frame 6 as shown in FIG. 6.

FIG. 5 illustrates that the detent noses 12 of the securing frame 6 are arranged only in sections along the circumference of the securing frame 6 in a distributed manner; no detent nose is shown in the lower area of the securing frame 6 below the lens 1 at this point.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Fastening arrangement of a cover disk as a component of a motor vehicle headlight, comprising:

a shell having at least one open side, the cover disk, which is transparent, closing off the at least one open side of the shell and being glued to the shell, a sealing profile surrounding the cover disk, at least one outwardly projecting profile shoulder constructed on an outer circumference of the cover disk, and mechanical devices by which the sealing profile is fastened to the shell, wherein the sealing profile is designed as a securing frame which form-lockingly reaches over the profile shoulder of the cover disk and which is fastened to the shell by said mechanical devices.

2. Fastening arrangement of a cover disk according to claim 1, wherein the securing frame has a profile section facing away from the shell which is designed as a gap screen adapted to gaps between the cover disk and adjoining vehicle body parts.

3. Fastening arrangement of a cover disk according to claim 1, wherein said mechanical devices form a detent connection which is constructed for fastening the securing frame on the shell, mutually corresponding detent elements being arranged on the shell and on the securing frame.

4. Fastening arrangement of a cover disk according to claim 1, and further comprising at least one fastening receiving device on the securing frame for linking an operating component to the securing frame.

5. Fastening arrangement of a cover disk according to claim 1, and further comprising at least one outwardly projecting elastic sealing lip which is arranged on the securing frame for a tight contact on adjoining vehicle body parts.

6. Fastening arrangement of a cover disk according to claim 4, wherein the operating component is a bumper section.

7. Fastening arrangement of a cover disk according to claim 2, and further comprising at least one fastening receiving device on the securing frame for linking an operating component to the securing frame.

8. Fastening arrangement of a cover disk according to claim 7, wherein the operating component is a bumper section.

9. Fastening arrangement of a cover disk according to claim 2, and further comprising at least one outwardly projecting elastic sealing lip which is arranged on the securing frame for a tight contact on adjoining vehicle body parts.

10. Fastening arrangement of a cover disk according to claim 3, and further comprising at least one fastening receiving device on the securing frame for linking an operating component to the securing frame.

11. Fastening arrangement of a cover disk according to claim 10, wherein the operating component is a bumper section.

12. Fastening arrangement of a cover disk according to claim 3, and further comprising at least one outwardly projecting elastic sealing lip which is arranged on the securing frame for a tight contact on adjoining vehicle body parts.

13. Fastening arrangement of a cover disk according to claim 4, and further comprising at least one outwardly projecting elastic sealing lip which is arranged on the securing frame for a tight contact on adjoining vehicle body parts.

14. Fastening arrangement of a cover disk according to claim 5, wherein the operating component is a bumper section.

15. Fastening arrangement of a cover disk according to claim 9, wherein the operating component is a bumper section.

16. Fastening arrangement of a cover disk according to claim 12, wherein the operating component is a bumper section.

17. Fastening arrangement of a cover disk according to claim 13, wherein the operating component is a bumper section.

18. A motor vehicle headlight fastening arrangement comprising:

at least one outwardly projecting profile shoulder on an outer circumference of a headlight lens, a securing frame which reaches in a form-locking manner over said projecting profile shoulder, and a detent connection by which the securing frame is fastened to a headlight shell covered by said headlight lens.

19. A motor vehicle headlight fastening arrangement according to claim 18, and further comprising a transverse web disposed between a forward end of said securing frame and an outer surface of said headlight lens.

20. A motor vehicle headlight fastening arrangement according to claim 18, and further comprising detent noses interconnecting said securing frame and said headlight shell.

* * * * *